(12) United States Patent
Bish et al.

(10) Patent No.: US 8,765,875 B2
(45) Date of Patent: Jul. 1, 2014

(54) CURABLE FLUOROELASTOMER COMPOSITION

(75) Inventors: Christopher J Bish, Kennet Square, PA (US); Peter A Morken, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 127 days.

(21) Appl. No.: 13/420,697

(22) Filed: Mar. 15, 2012

(65) Prior Publication Data

US 2013/0072636 A1 Mar. 21, 2013

Related U.S. Application Data

(60) Provisional application No. 61/469,856, filed on Mar. 31, 2011.

(51) Int. Cl.
*C08F 8/04* (2006.01)
*C08F 8/30* (2006.01)

(52) U.S. Cl.
USPC .................. 525/326.3; 525/326.2; 525/326.1; 525/377; 525/329.2

(58) Field of Classification Search
USPC .............. 525/326.3, 326.2, 326.1, 377, 329.2
See application file for complete search history.

(56) References Cited

U.S. PATENT DOCUMENTS

| | | | |
|---|---|---|---|
| 4,281,092 A | 7/1981 | Breazeale | |
| 4,394,489 A | 7/1983 | Aufdermarsh et al. | |
| 5,605,973 A | 2/1997 | Yamamoto et al. | |
| 5,637,648 A | 6/1997 | Saito et al. | |
| 5,668,221 A | 9/1997 | Saito et al. | |
| 5,789,489 A | 8/1998 | Coughlin et al. | |
| 5,789,509 A | 8/1998 | Schmiegel | |
| 6,281,296 B1 | 8/2001 | MacLachlan et al. | |
| 6,638,999 B2 | 10/2003 | Bish | |
| 7,300,985 B2 | 11/2007 | Grootaert et al. | |
| 2011/0009569 A1 | 1/2011 | Grootaert et al. | |
| 2013/0190456 A1* | 7/2013 | Hirano | 525/326.2 |

FOREIGN PATENT DOCUMENTS

| | | | |
|---|---|---|---|
| EP | 1411085 A1 | | 4/2004 |
| JP | 11-116633 | * | 4/1999 |
| JP | 2003-171520 | * | 6/2003 |
| WO | 0159005 A2 | | 8/2001 |
| WO | 2006068685 A1 | | 6/2006 |
| WO | 2011084404 A1 | | 7/2011 |
| WO | 2012077583 A1 | | 6/2012 |

OTHER PUBLICATIONS

Translation of JP 2003-171520—2003.*
Translation of JP 11-116633—1999.*
International Search Report of corresponding PCT/US2012/031726 case: European Patent Office in Rijswijk, NL, Authorized Officer Sonja Behm, Aug. 24, 2012.

* cited by examiner

*Primary Examiner* — Robert C Boyle

(57) ABSTRACT

Fluoroelastomer compositions comprising fluoroelastomers having copolymerized units of a nitrile-containing cure site monomer are cured with certain hydrazide curatives. The hydrazide is of the general formula $R^1C(O)NHNHR^2$, wherein $R^1$ is alkyl, aryl, benzyl, heterocycle, fluoroalkyl, or H; $R^2$ is H, alkyl, aryl, heterocycle, $CO_2R^3$, $C(O)H$, or $CH_2R^4$; $R^3$ is alkyl, $CH_2R^4$, aryl, benzyl, or heterocycle; and $R^4$ is a fluoroalkyl group.

13 Claims, No Drawings

CURABLE FLUOROELASTOMER COMPOSITION

CROSS-REFERENCE TO RELATED APPLICATIONS

This application claims the benefit of U.S. Provisional Application No. 61/469,856 filed Mar. 31, 2011.

FIELD OF THE INVENTION

This invention relates to curable fluoroelastomer compositions and more particularly to fluoroelastomer compositions containing certain hydrazides as curing agents.

BACKGROUND OF THE INVENTION

Fluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment that operates at high temperatures.

The outstanding properties of fluoroelastomers are largely attributable to the stability and inertness of the copolymerized fluorinated monomer units that make up the major portion of the polymer backbones in these compositions. Such monomers include vinylidene fluoride, hexafluoropropylene, tetrafluoroethylene and perfluoro(alkyl vinyl) ethers. In order to develop elastomeric properties fully, fluoroelastomers are typically crosslinked, i.e. vulcanized. To this end, a small percentage of cure site monomer is copolymerized with the fluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; 5,789,509 and in WO 2011084404.

Bisamidoximes (U.S. Pat. No. 5,668,221) and bisamidrazones (U.S. Pat. Nos. 5,605,973; 5,637,648) have been used as vulcanizing agents for fluoroelastomers having nitrile group cure sites. These cures may be scorchy, i.e. crosslinking may begin before the final shaping of the composition. Also, the curatives require complex, multistep syntheses from expensive starting materials.

Other nitrogen containing nucleophilic compounds have been employed to crosslink fluoroelastomers having nitrile group cure sites (U.S. Pat. No. 6,638,999 B2). Some of these curatives are scorchy while others are volatile at rubber milling temperatures.

Fluoropolymers having pendant amidrazone or amidoxime groups are also known (U.S. Pat. No. 7,300,985 B2). These polymers require an additional polymer modification step in order to form crosslinks.

SUMMARY OF THE INVENTION

The present invention is directed to curable fluoroelastomer compositions which comprise a fluoroelastomer having nitrile group cure sites and certain hydrazides as curatives. More specifically, the present invention is directed to a curable composition comprising:

A) a fluoroelastomer comprising copolymerized units of a nitrile group-containing cure site monomer; and B) a hydrazide of the general formula $R^1C(O)NHNHR^2$, wherein $R^1$ is alkyl, aryl, benzyl, heterocycle, fluoro-alkyl, or H; $R^2$ is H, alkyl, aryl, heterocycle, $CO_2R^3$, $C(O)H$, or $CH_2R^4$; $R^3$ is alkyl, $CH_2R^4$, aryl, benzyl, or heterocycle; and $R^4$ is a fluoroalkyl group.

Another aspect of the present invention is a cured article made from the above composition.

DETAILED DESCRIPTION OF THE INVENTION

The fluoroelastomer that may be employed in the composition of the invention may be partially fluorinated or perfluorinated. Fluoroelastomers preferably contain between 25 and 70 weight percent, based on the total weight of the fluoroelastomer, of copolymerized units of a first monomer which may be vinylidene fluoride ($VF_2$) or tetrafluoroethylene (TFE). The remaining units in the fluoroelastomers are comprised of one or more additional copolymerized monomers, different from said first monomer, selected from the group consisting of fluoromonomers, hydrocarbon olefins and mixtures thereof. Fluoromonomers include fluorine-containing olefins and fluorine-containing vinyl ethers.

Fluorine-containing olefins which may be employed to make fluoroelastomers include, but are not limited to vinylidene fluoride ($VF_2$), hexafluoropropylene (HFP), tetrafluoroethylene (TFE), 1,2,3,3,3-pentafluoropropene (1-HPFP), 1,1,3,3,3-pentafluoropropene (2-HPFP), chlorotrifluoroethylene (CTFE) and vinyl fluoride.

Fluorine-containing vinyl ethers that may be employed to make fluoroelastomers include, but are not limited to perfluoro(alkyl vinyl) ethers. Perfluoro(alkyl vinyl) ethers (PAVE) suitable for use as monomers include those of the formula

  (I)

where $R_f$ and $R_{f''}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl) ethers includes compositions of the formula

  (II)

where X is F or $CF_3$, n is 0-5, and $R_f$ is a perfluoroalkyl group of 1-6 carbon atoms.

A most preferred class of perfluoro(alkyl vinyl) ethers includes those ethers wherein n is 0 or 1 and $R_f$ contains 1-3 carbon atoms. Examples of such perfluorinated ethers include perfluoro(methyl vinyl ether) (PMVE), perfluoro(ethyl vinyl ether) (PEVE) and perfluoro(propyl vinyl ether) (PPVE). Other useful monomers include those of the formula

  (III)

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl) ether monomers include compounds of the formula

  (IV)

where m and n independently=0-10, p=0-3, and x=1-5. Preferred members of this class include compounds where n=0-1, m=0-1, and x=1.

Other examples of useful perfluoro(alkyl vinyl ethers) include

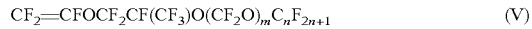  (V)

where n=1-5, m=1-3, and where, preferably, n=1.

If copolymerized units of PAVE are present in fluoroelastomers employed in the invention, the PAVE content generally ranges from 25 to 75 weight percent, based on the total weight of the fluoroelastomer. If perfluoro(methyl vinyl ether) is used, then the fluoroelastomer preferably contains between 30 and 65 wt. % copolymerized PMVE units.

Hydrocarbon olefins useful in the fluoroelastomers employed in the invention include, but are not limited to ethylene and propylene. If copolymerized units of a hydrocarbon olefin are present in the fluoroelastomers, hydrocarbon olefin content is generally 4 to 30 weight percent.

The fluoroelastomer further contains copolymerized units of at least one cure site monomer, generally in amounts of from 0.1-5 mole percent. The range is preferably between 0.3-1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2-12, preferably 2-6;

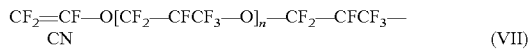

$$CF_2=CF-O[CF_2-CFCF_3-O]_n-CF_2-CFCF_3-CN \quad (VII)$$

where n=0-4, preferably 0-2;

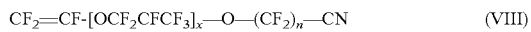

$$CF_2=CF-[OCF_2CFCF_3]_x-O-(CF_2)_n-CN \quad (VIII)$$

where x=1-2, and n=1-4; and

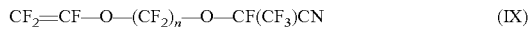

$$CF_2=CF-O-(CF_2)_n-O-CF(CF_3)CN \quad (IX)$$

where n=2-4.

Those of formula (VIII) are preferred. Especially preferred cure site monomers are perfluorinated polyethers having a nitrile group and a trifluorovinyl ether group. A most preferred cure site monomer is

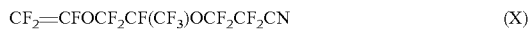

$$CF_2=CFOCF_2CF(CF_3)OCF_2CF_2CN \quad (X)$$

i.e. perfluoro(8-cyano-5-methyl-3,6-dioxa-1-octene) or 8-CNVE.

A first aspect of this invention is a curable composition comprising A) a fluoroelastomer comprising copolymerized units of a nitrile group-containing cure site monomer selected from the group consisting of nitrile-containing fluorinated olefins and nitrile-containing fluorinated vinyl ethers; and B) a certain hydrazide. The hydrazide may be a mono-, di-, or poly-hydrazide. The hydrazide is of the general formula $R^1C(O)NHNHR^2$, wherein $R^1$ is alkyl, aryl, benzyl, heterocycle, fluoroalkyl, or H; $R^2$ is H, alkyl, aryl, heterocycle, $CO_2R^3$, $C(O)H$, or $CH_2R^4$; $R^3$ is alkyl, $CH_2R^4$, aryl, benzyl, or heterocycle; and $R^4$ is a fluoroalkyl group. The alkyl, aryl, benzyl or heterocycle groups may contain additional functional groups such as, but not limited to halogen, ether, or amide groups. The fluoroalkyl group has at least one of the hydrogen atoms replaced by fluorine and may optionally contain 1 or more oxygen atoms in the chain. $R^1$, $R^2$, $R^3$, or $R^4$ may have 1, 2, or more points of attachment to a hydrazide to afford a mono-, di-, or poly-hydrazide. Compounds that decompose to form one of these hydrazides may also be employed in the composition of the invention. The hydrazide may also be a salt, e.g. benzoylhydrazine hydrochloride. Lastly, the oxygen atom may be replaced by sulfur.

Preferred hydrazides include those wherein $R^1$ is alkyl and $R^2$ is H; $R^1$ is alkyl and $R^2$ is $CO_2R^3$; $R^1$ is aryl and $R^2$ is H; $R^1$ is aryl and $R^2$ is $CO_2R^3$; $R^1$ is heterocycle and $R^2$ is H; $R^1$ is H and $R^2$ is H or $CO_2R^3$; $R^1$ is benzyl and $R^2$ is H or $CO_2R^3$; and $R^1$ is fluoroalkyl and $R^2$ is H or $CO_2R^3$.

Specific examples of these hydrazide curatives include, but are not limited to formic hydrazide; diformylhydrazine; benzhydrazide; isobutyric acid, hydrazide; malonic dihydrazide; succinic dihydrazide; adipic dihydrazide; 1,3-imidazolidine-dipropanoic acid, 4-(1-methylethyl)-2,5-dioxo-, 1,3-dihydrazide; tetradecanedioic acid, 1,14-dihydrazide; isoniazide; 2-hydroxybenzhydrazide; hexanedioic acid, 2,2,3,3,4,4,5,5-octafluoro-, 1,6-dihydrazide; and isophthalic dihydrazide. More preferred hydrazides include formic hydrazide; benzhydrazide; isobutyric acid, hydrazide; and isoniazide.

It is theorized that these hydrazides act as curing agents by causing the dimerization of polymer chain bound nitrile groups to form 1,2,4-triazole rings, thus crosslinking the fluoroelastomer. The hydrazides are less volatile than curatives such as hydrazine or t-butyl carbazate, making the hydrazide curatives less likely to be fugitive during mixing and shaping processes.

In order to be useful as either the major, or as the only curative for these fluoroelastomers, the level of hydrazide should be about 0.05 to 7 parts hydrazide per 100 parts fluoroelastomer, preferably about 0.1 to 3 parts hydrazide per 100 parts fluoroelastomer, most preferably about 0.5 to 2 parts hydrazide per 100 parts fluoroelastomer. As used herein, "parts" refers to parts by weight, unless otherwise indicated.

An appropriate level of hydrazide can be selected by considering cure properties, for example the time to develop maximum moving die rheometer (MDR) torque and minimum Mooney scorch of the curable compositions. The optimum level will depend on the particular combination of fluoroelastomer and hydrazide.

Optionally, a curative accelerator, e.g. a compound that releases ammonia at curing temperatures, may be used in combination with a hydrazide curative. Examples of compounds that decompose to release ammonia at curing temperatures are disclosed in U.S. Pat. No. 6,281,296 B1 and U.S. 2011/00095969.

Optionally, another curative commonly employed to crosslink fluoroelastomers having nitrile-group cure sites may be used in addition to the hydrazide. Examples of such other curatives include, but are not limited to diaminobisphenol AF, 2,2-bis(3-amino-4-anilinophenyl)hexafluoropropane, mono- or bis-amidines, mono- or bis-amidrazones, mono- or bis-amidoximes, or an organic peroxide plus coagent.

Additives, such as carbon black, fluoropolymer micropowders, stabilizers, plasticizers, lubricants, fillers, and processing aids typically utilized in fluoroelastomer compounding can be incorporated into the compositions of the present invention, provided they have adequate stability for the intended service conditions.

The curable compositions of the invention may be prepared by mixing the fluoroelastomer, hydrazide and other components using standard rubber compounding procedures. For example, the components may be mixed on a two roll rubber mill, in an internal mixer (e.g. a Banbury® internal mixer), or in an extruder. The curable compositions may then be crosslinked (i.e. cured) by application of heat and/or pressure. When compression molding is utilized, a press cure cycle is generally followed by a post cure cycle during which the press cured composition is heated at elevated temperatures in excess of 300° C. for several hours.

The curable compositions of the present invention are useful in production of gaskets, tubing, and seals. Such cured articles are generally produced by molding a compounded formulation of the curable composition with various additives under pressure, curing the part, and then subjecting it to a post cure cycle. The cured compositions have excellent thermal stability, steam and chemical resistance. Volume swell (ASTM D1414) after exposure to 225° C. water for at least 168 hours, preferably at least 336 hours, is less than 5%. Also compression set, 300° C., 70 hours, 15% compression (ASTM D395) is less than 70%. The cured compositions are particularly useful in applications such as seals and gaskets for manufacturing semiconductor devices, and in seals for high temperature automotive uses.

Other fluoropolymers containing nitrile cure sites, such as fluoroplastics may be substituted for fluoroelastomers in the compositions of the invention.

The invention is now illustrated by certain embodiments wherein all parts are by weight unless otherwise specified.

EXAMPLES

Test Methods

Cure Characteristics

Cure characteristics were measured using a Monsanto MDR 2000 instrument under the following conditions:
Moving die frequency: 1.66 Hz
Oscillation amplitude: ±0.5 degrees
Temperature: 190° C., unless otherwise noted
Sample size: Disks having diameter of 1.5 inches (38 mm)
Duration of test: 30 minutes
The following cure parameters were recorded:
$M_H$: maximum torque level, in units of dN·m
$M_L$: minimum torque level, in units of dN·m
Tc90: time to 90% of maximum torque, minutes
Test specimens were prepared from elastomer compounded with appropriate additives, as described in the formulations listed in the Examples below. Compounding was carried out on a rubber mill. The milled composition was formed into a sheet and a 10 g sample was die cut into a disk to form the test specimen.

Compression set of O-ring samples was determined in accordance with ASTM D395. Mean values are reported.

Volume swell in water was measured at 225° C. in accordance with ASTM D1414 for the times indicated in the Tables.

The following fluoroelastomer polymers were used in the Examples:
FFKM1—A terpolymer containing 61.8 mole percent units of TFE, 37.4 mole percent units of PMVE and 0.80 mole percent units of 8-CNVE was prepared according to the general process described in U.S. Pat. No. 5,789,489.
FFKM2—was made by the same process as FFKM1, but contained 74.7 mole percent units of TFE, 24.6 mole percent units of PMVE and 0.70 mole percent units of 8-CNVE.

Example 1

A curable composition of the invention was compounded on a two-roll rubber mill in the proportions shown in Table I. The compounded composition is labeled Example 1 (formic hydrazide, available from Sigma-Aldrich) in Table I. Cure characteristics of the compounded composition is also shown in Table I.

O-rings were made by press curing the curable composition at a temperature of 190° C. for Tc90 plus 5 minutes, followed by a post cure in a nitrogen atmosphere at a temperature of 305° C. for 26 hours after a slow temperature ramp up from room temperature. Compression set values and volume swell are reported in Table I.

In order to compare volume swells of the composition of the invention with a prior art composition, o-rings were made from a similar compound, but containing 0.25 phr urea as curative, rather than formic hydrazide. After only 168 hours of exposure to 225° C. water, the urea cured o-rings exhibited a 15.7% volume swell.

TABLE I

|  | Example 1 |
| --- | --- |
| Formulation (phr)[1] | |
| FFKM1 | 100 |
| Carbon Black MT N990 | 30 |
| Formic hydrazide | 0.50 |
| Cure Characteristics | |
| $M_L$ (dN·m) | 5.2 |
| $M_H$ (dN·m) | 11.5 |
| Tc90, minutes | 16.3 |
| Compression set, 300° C., 70 hours, 25% compression, % | 42.4 |
| Volume swell, 336 hours, % | 1.6 |

[1]Parts per hundred parts fluoroelastomer

Examples 2-4

Curable compositions of the invention were compounded on a two-roll rubber mill in the proportions shown in Table II. The compounded compositions are labeled Example 2 (benzhydrazide, available from Alfa-Aesar), Example 3 (isobutyric acid hydrazide, available from Oakwood Products, Inc.) and Example 4 (isoniazide, Alfa-Aesar) in Table II. Cure characteristics of the compounded compositions are also shown in Table II. O-rings were made by the same process as disclosed for Example 1. Compression set and volume swell values are also shown in Table II.

TABLE II

|  | Example 2 | Example 3 | Example 4 |
| --- | --- | --- | --- |
| Formulation (phr) | | | |
| FFKM1 | 0 | 100 | 100 |
| FFKM2 | 100 | 0 | 0 |
| Carbon Black MT N990 | 30 | 30 | 30 |
| Benzhydrazide | 1.0 | 0 | 0 |
| Isobutyric acid hydrazide | 0 | 0.77 | 0 |
| isoniazide | 0 | 0 | 1.04 |
| Cure Characteristics | | | |
| $M_L$ (dN·m) | 2.83 | 1.70 | 2.36 |
| $M_H$ (dN·m) | 11.92 | 9.83 | 12.77 |
| Tc90, minutes | 10.2 | 16.8 | 16.3 |
| Compression set, 300° C., 70 hours, 15% compression, % | 34.9 | 57.1 | 55.6 |
| Volume swell, 168 hours, % | 0.7 | 0.8 | 1.4 |

What is claimed is:
1. A curable composition comprising:
A) a fluoroelastomer comprising copolymerized units of a nitrile group-containing cure site monomer; and
B) a hydrazide of the general formula $R^1C(O)NHNHR^2$, wherein said oxygen atom may optionally be replaced by a sulfur atom and wherein $R^1$ is benzyl, fluoroalkyl, or H; $R^2$ is H, alkyl, aryl, heterocycle, $CO_2R^3$, $C(O)H$, or $CH_2R^4$; $R^3$ is alkyl, $CH_2R^4$, aryl, benzyl, or heterocycle; and $R^4$ is a fluoroalkyl group.
2. A curable composition of claim 1 wherein $R^1$ is H and $R^2$ is H or $CO_2R^3$.

3. A curable composition of claim 2 wherein said hydrazide is formic hydrazide.

4. A curable composition of claim 1 wherein $R^1$ is benzyl and $R^2$ is H or $CO_2R^3$.

5. A curable composition of claim 1 wherein $R^1$ is fluoroalkyl and $R^2$ is H or $CO_2R^3$.

6. A curable composition of claim 1 further comprising a curative accelerator.

7. A cured article made from the composition of claim 1.

8. A cured article of claim 7 having a volume swell, measured according to ASTM D1414, after exposure to 225° C. water for at least 168 hours of less than 5% and a compression set, 300° C., 70 hours, 15% compression, measured according to ASTM D395, of less than 70%.

9. A curable composition comprising:
   A) a fluoroelastomer comprising copolymerized units of a nitrile group-containing cure site monomer; and
   B) a hydrazide selected from the group consisting of benzhydrazide; 2-hydroxybenzhydrazide; isophthalic dihydrazide; and isoniazide.

10. The curable composition of claim 9 wherein said hydrazide is selected from the group consisting of benzhydrazide; 2-hydroxybenzhydrazide; and isophthalic dihydrazide.

11. The curable composition of claim 9 wherein said hydrazide is selected from the group consisting of isoniazide.

12. A cured article made from the composition of claim 9.

13. A cured article of claim 12 having a volume swell, measured according to ASTM D1414, after exposure to 225° C. water for at least 168 hours of less than 5% and a compression set, 300° C., 70 hours, 15% compression, measured according to ASTM D395, of less than 70%.

* * * * *